Figure 1:
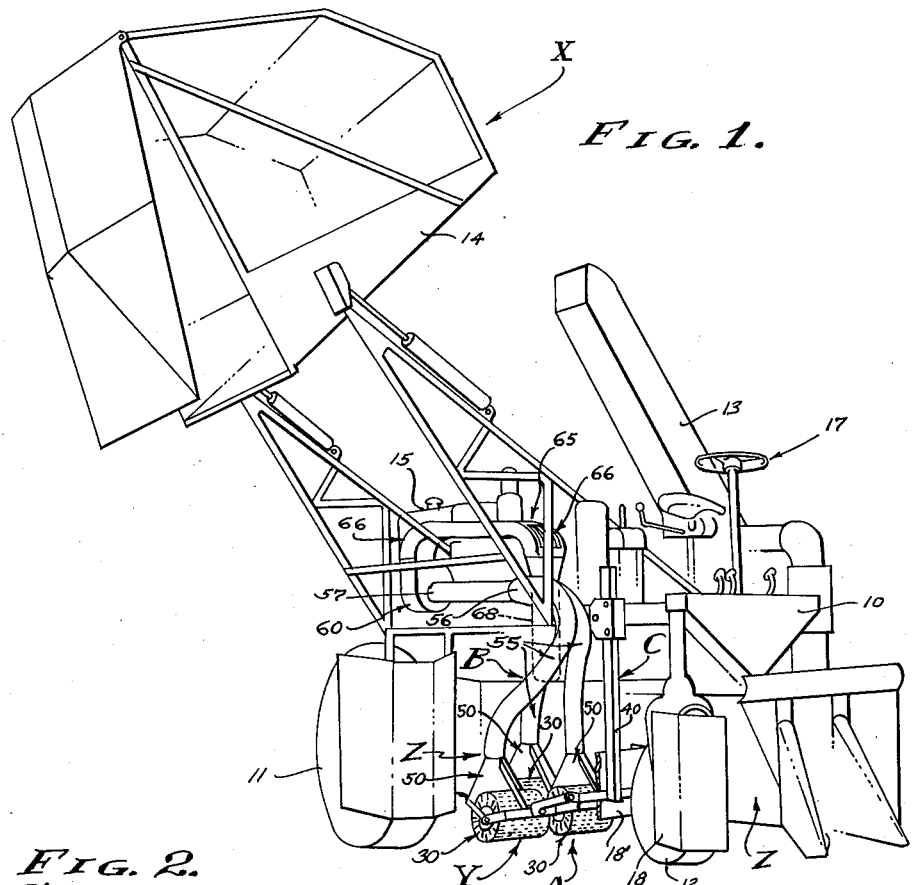

June 26, 1962    H. R. DE TUNCQ ETAL    3,040,505
MATERIAL GATHERING APPARATUS
Filed Dec. 31, 1958    4 Sheets-Sheet 1

INVENTORS.
HAROLD R. DETUNCQ
LEE R. HERRING
BY
W. H. Maxwell
AGENT

June 26, 1962 H. R. DE TUNCQ ETAL 3,040,505
MATERIAL GATHERING APPARATUS
Filed Dec. 31, 1958 4 Sheets-Sheet 2
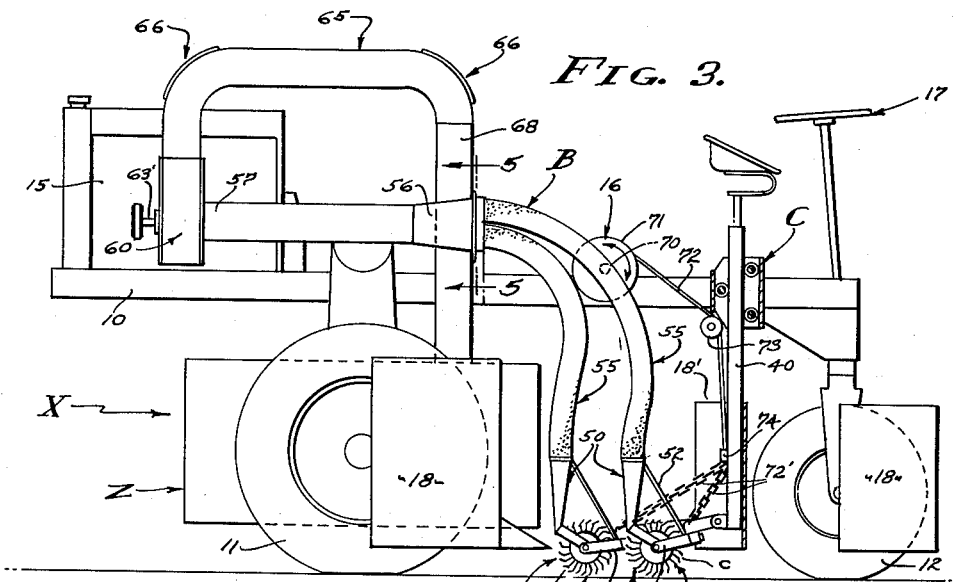
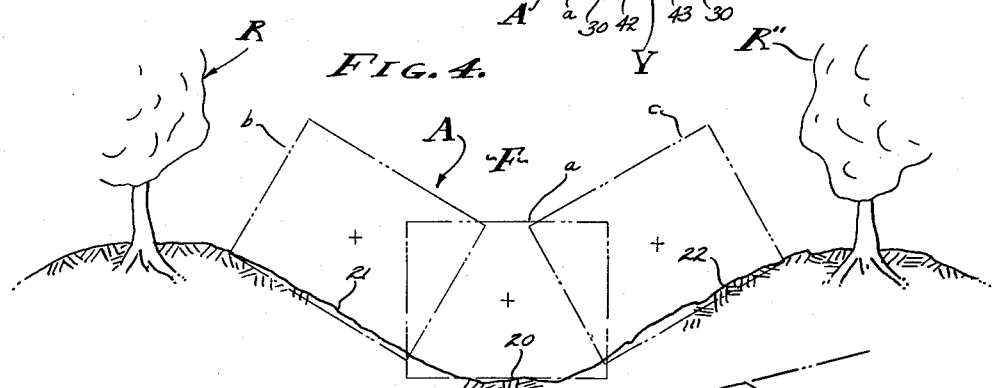
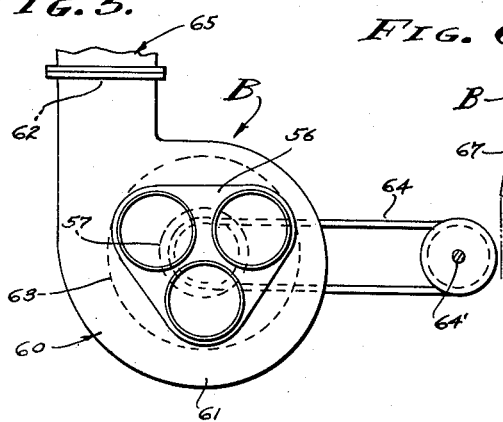
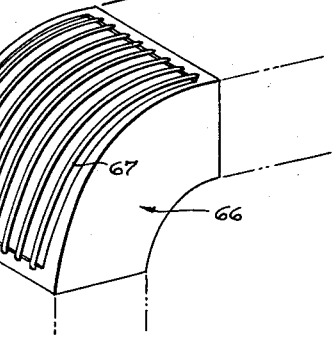
INVENTORS.
HAROLD R. DETUNCQ
LEE R. HERRING
BY
AGENT June 26, 1962 H. R. DE TUNCQ ETAL 3,040,505
MATERIAL GATHERING APPARATUS
Filed Dec. 31, 1958 4 Sheets-Sheet 3
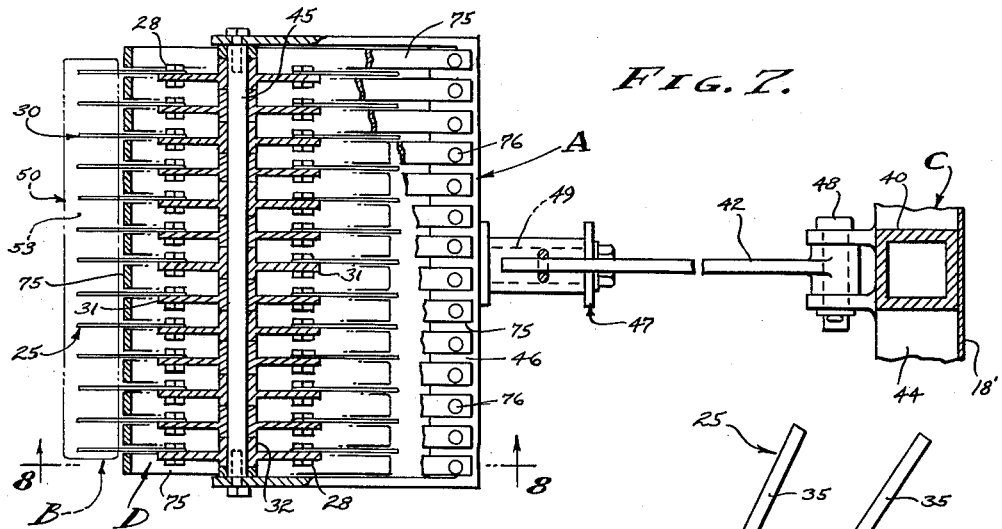
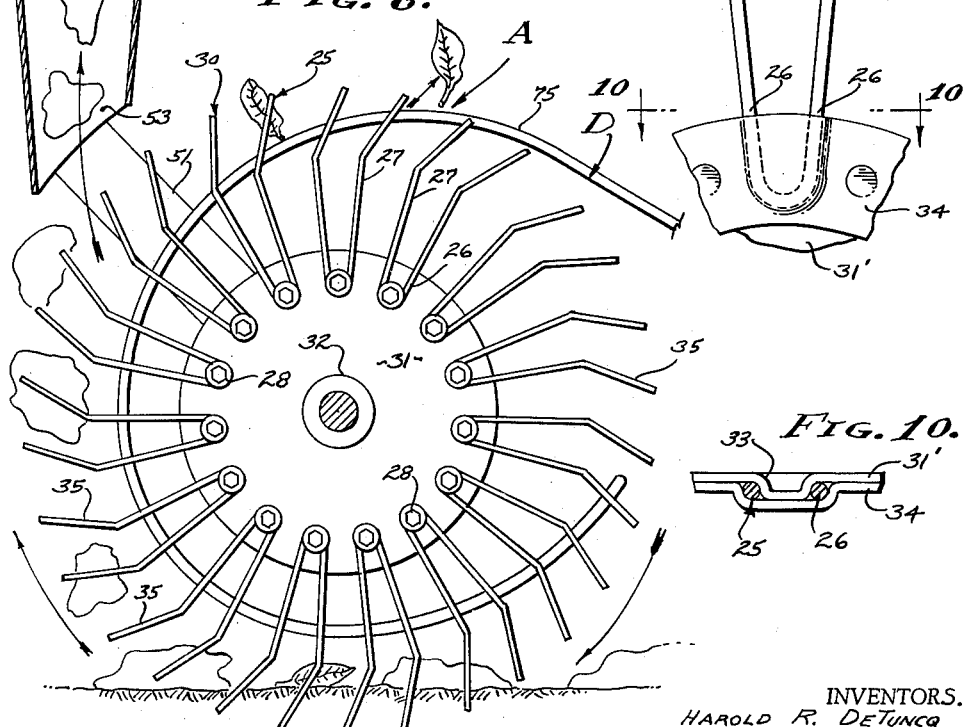
INVENTORS.
HAROLD R. DETUNCQ
LEE R. HERRING
BY W. H. Maxwell
AGENT June 26, 1962 H. R. DE TUNCQ ETAL 3,040,505
MATERIAL GATHERING APPARATUS
Filed Dec. 31, 1958 4 Sheets-Sheet 4
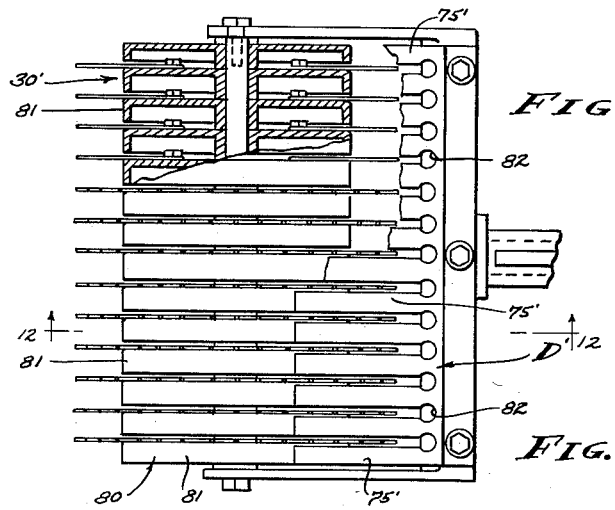
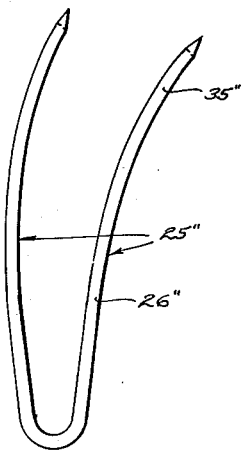
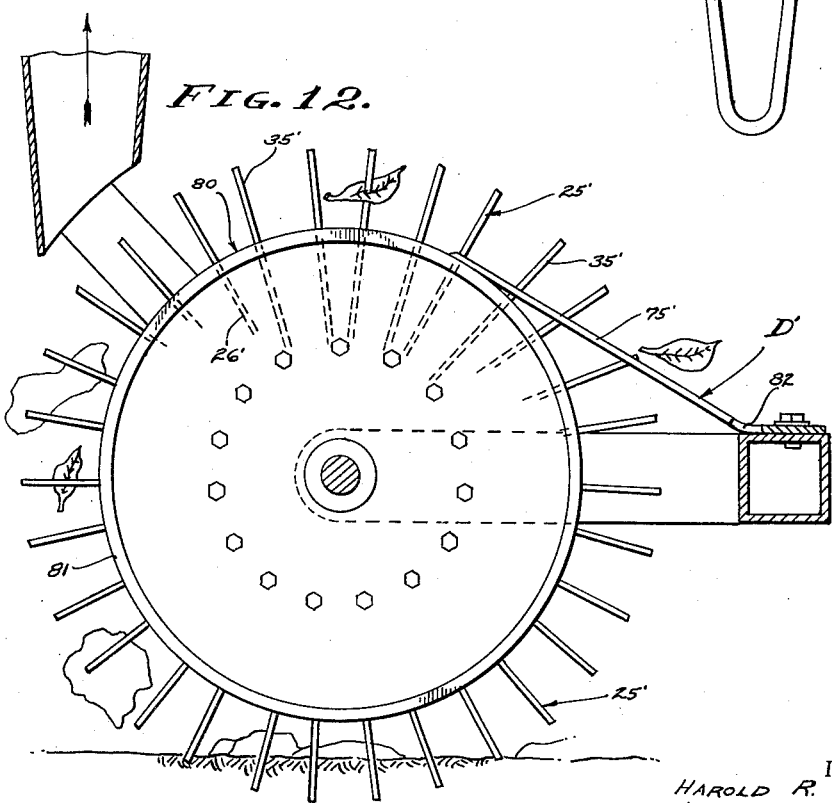
INVENTORS.
HAROLD R. DE TUNCQ
LEE R. HERRING
BY
W. H. Maxwell
AGENT __United States Patent Office__

3,040,505
Patented June 26, 1962

3,040,505
MATERIAL GATHERING APPARATUS
Harold R. De Tuncq, Arvin, Calif. (9572 Lake Natoma Drive, Orangevale, Calif.), and Lee R. Herring, P.O. Box 457, Arvin, Calif.
Filed Dec. 31, 1958, Ser. No. 784,347
13 Claims. (Cl. 56—28)

This invention relates to a material or cotton gathering apparatus and is particularly concerned with a mechanism in the form of an attachment to be applied to a cotton picking machine, or the like, it being a general object of this invention to provide a practical means for ground recovery of otherwise wasted material or cotton during harvest thereof from the field.

The principles of picking cotton by machine are well advanced, but there has been no means provided to pick up the "drop" cotton, or cotton that falls to the ground. When picking is done by hand the pickers can easily reach to the ground for "drop" cotton and add said "drop" cotton to the yield of the crop. However, with mechanical pickers, only that cotton which is on the plant is picked, and any "drop" is passed over by the machine, and as a matter of fact, is worked into the ground resulting in waste.

The "drop" cotton is a result of several factors. One factor is that ripened or open cotton is easily dislodged from the plant, with the result that some cotton fibers and seed naturally fall to the ground. Another factor is that ripened cotton is blown from or off of the plants by winds that obviously cannot be controlled or predicted. Still another factor is that in the raising of cotton and the picking thereof by machinery, in particular, defoliation procedures are practiced in order to untangle the plants and to strip the plants of leaves, etc. Said defoliation is carried out mechanically and/or chemically and in any case, as a result thereof, "drop" cotton is increased. In other words, with the above mentioned factors, and perhaps others not mentioned, a substantial amount of cotton fibers and seed shakes out of the plants and falls to the ground between the rows of cotton plants.

In actual farming experience "drop" cotton represents from 5% to about 10% of the harvest, and where land is producing 2500 pounds to 3000 pounds per acre the "drop" can represent a waste of 250 to 300 pounds per acre. Although it would not be commercially practical to salvage or recover said "drop" by hand, applicants have conducted recovery of "drop" cotton, and with hand gathering they have salvaged approximately 10% of the first picking of the crop, said 10% being the amount of "drop" on the ground at the time of the first picking. Therefore, it is apparent that a substantial amount of cotton fibers and seed become waste when employing only the ordinary harvesting machinery.

With the foregoing in mind, there is an additional factor to consider. That is, "drop" cotton is combined with trash in the form of leaves and twigs, etc. The trash problem is augmented due to the fact that "drop" accumulates on the ground in the presence of any and all other trash that accumulates there. As a result, the "drop" cotton might be considered too dirty, so to speak, to be of any real value. However, as later set forth, the "drop" cotton is separated from the trash by combining elements as hereinafter described.

An object of this invention is to provide an apparatus that recovers "drop" cotton from the ground between the rows of plants of the crop.

Another object of this invention is to provide an apparatus that engages "drop" cotton at the ground and lifts it in order that it can be added to the picking of the harvest.

Another object of this invention is to provide an apparatus that lifts "drop" cotton from the ground and then delivers it to storage, or to further processing means.

Another object of this invention is to provide an apparatus that engages and lifts "drop" cotton and which also strips trash from the apparatus during operation thereof, so that trash does not accumulate and which would otherwise hamper operation of the apparatus.

Still another object of this invention is to provide an apparatus and combination of apparatus in a cotton picking machine that supplements the picking of the machine with "drop" cotton that is cleaned and separated from trash.

It is still another object of this invention to provide an apparatus operable in the furrows between rows of plants to lift "drop" cotton and to recover the same as said apparatus is advanced over or through the crop.

It is also an object of this invention to provide an apparatus of the character referred to that is cooperatively related to a cotton picking machine to recover "drop" cotton adjacent the row or rows of plants being picked by the picking machine and simultaneously with said picking.

Further, it is an object of this invention to provide a practical and relatively simple apparatus for the purposes hereinabove set forth and which is readily installed on picking machinery and which is reliable and efficient in operation.

Figure 2:
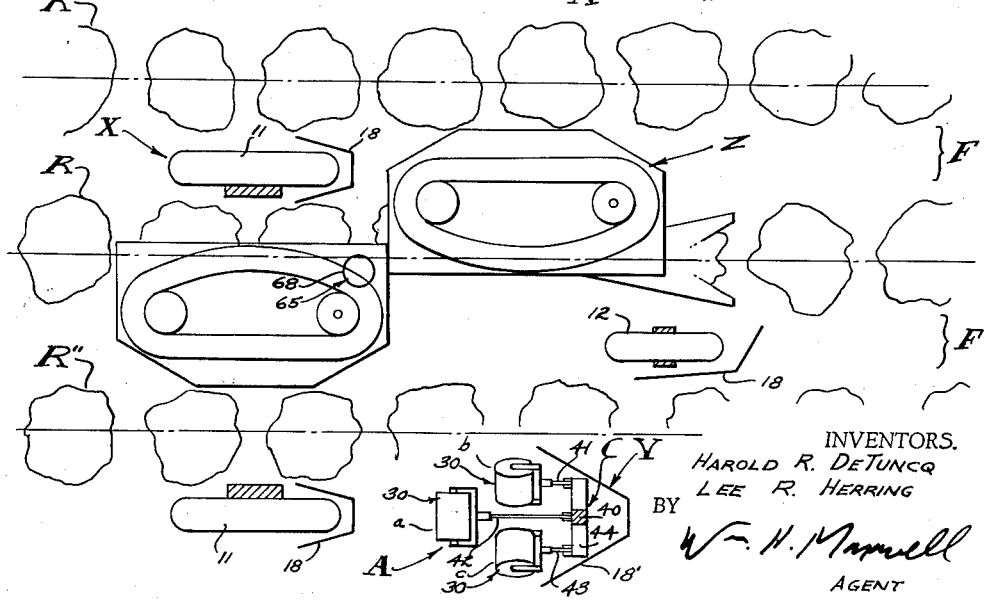

The various objects and features of our invention will be fully understood from the following detailed description of the typical preferred forms and applications of our invention, throughout which description reference is made to the accompanying drawings, in which:

FIG. 1 is a perspective view illustrating the application of the apparatus that we provide to a typical cotton picking or harvesting machine. FIG. 2 is a diagrammatic plan view showing the relationship of the elements of the picking machine and of the apparatus that we provide and which is cooperatively related with said machine. FIG. 3 is a side elevation of the picking machine shown in FIGS. 1 and 2 and showing the installation of the apparatus that we provide. FIG. 4 is a transverse sectional view taken through a furrow and showing the manner in which the apparatus is related thereto. FIG. 5 is an enlarged detailed sectional view taken as indicated by line 5—5 on FIG. 3. FIG. 6 is an enlarged perspective view showing in detail the construction of the ducting that we employ to carry the cotton that is gathered from the ground to the picking head of the cotton picking machine. FIG. 7 is an enlarged detailed view, partially in section, showing one of the elements of the apparatus that we provide. FIG. 8 is an enlarged detailed view taken as indicated by line 8—8 on FIG. 7. FIG. 9 is an enlarged detailed view of a portion of the structure similar to that shown in FIG. 8 and showing a modified connection of the fingers. FIG. 10 is a detailed sectional view taken as indicated by line 10—10 on FIG. 9. FIG. 11 is a view similar to FIG. 7 and shows a modified form of one of the elements of the apparatus. FIG. 12 is an enlarged detailed sectional view taken as indicated by line 12—12 on FIG. 11, and FIG. 13 is a view similar to FIG. 9 and shows a modified form of a part of the apparatus.

The apparatus that we provide is a material or crop gathering apparatus and is intended to be employed in the gathering of "drop" cotton that accumulates on the ground between the rows of plants. The apparatus herein disclosed can be employed by itself or in combination with other machinery and when so combined with a cotton harvester or cotton picking machine, certain unobvious results are obtained as later described. That is, the picking of the machine is supplemented by cleaned cotton from the recovery of the "drop" cotton. In FIG.

1 of the drawings we have shown a typical cotton picking machine X that is adapted to be advanced over or through a field of ripened cotton. Generally, the principle of the machine X is to bring rotating picking spindles into contact with the opened bolls of cotton whereupon the cotton fibers are wound onto the spindles and are pulled from and out of the bolls. Doffer means is employed to remove or strip the fibers, with the seed, from the spindles, after which the fibers and seed are delivered by a suction fan to a basket that is emptied from time to time. The details of construction of the machine X are complex and very widely in machines of different manufacture, but the gathering apparatus Y that we provide can be applied to any of these machines that has a picking head Z employing, for example, the spindle arrangement common to and characterizing said machines.

In FIGS. 1, 2 and 3 of the drawings, we have shown a single row cotton picking machine X with two picking heads Z in tandem. The gathering apparatus Y is shown applied to the machine X there being the usual elements of construction embodied in said machine. As shown, the machine X involves, generally, a frame 10 carried by wheels preferably a pair of rear traction wheels 11 and a front steering wheel 12, a pair of picking heads Z, one operable at each side of a row of plants R, cotton transporting means 13 to transfer the pickings from the head Z to a basket 14, and a prime mover 15 to power the machine. The prime mover 15 powers the traction wheels through a suitable transmission and a power-take-off drive operates the two heads Z and the transporting means 13. Further, an elevating system 16 is incorporated in the machine X under control of the operator to raise and lower the heads Z, and also used as later described to raise and lower parts of the apparatus that we provide. It will be readily apparent that the machine X includes all of the other necessary features of construction including operating controls 17, plant shields 18, etc.

The particular machine X illustrated in the drawings is a single row type machine carried on a tricycle type chassis. In this case, one traction wheel 11 follows behind one of the picking heads Z between adjacent rows R and R' of cotton plants. The steering wheel 12 precedes the other picking head Z between adjacent rows R and R" of cotton plants, the wheel 12 being located opposite the first mentioned picking head Z and the second picking head Z being located opposite the first mentioned wheel 11. The second or other traction wheel 11 is located opposite the second picking head Z. With the arrangement shown and thus far described the row R being picked passes between the two longitudinally spaced picking heads Z, the row R' remains untouched to the left of the machine, and the row R" passes untouched between the second picking head Z and the right hand traction wheel 11.

As best shown in FIG. 4, a furrow F exists between the rows of plants and involves a bottom or valley 20 and opposite inclined sides 21 and 22. As best illustrated in FIG. 2 the furrow F adjacent the picking machine X and adjacent, say for example, the row R" is exposed or accessible at the right hand side of the machine X ahead of the right hand wheel 11 and opposite the first picking head Z. Therefore, in the particular machine illustrated, the gathering apparatus Y is located at this point of access to the furrow where the "drop" cotton has accumulated. However, it is to be understood that the location of the gathering apparatus Y can be varied, not only in the particular machine illustrated, but also in different machines, all as circumstances require.

In accordance with the present invention we have provided the gathering apparatus Y that engages "drop" cotton to lift it and to transport it to a storage or further processing means. As shown in FIGS. 1 and 3 the gathering apparatus Y involves, generally, cotton or material engaging means A operable to be in contact with the ground, a cotton or material transporting means B, elevating means C, and trash stripping means D. The means A operates to collect "drop" cotton and to lift it off the ground, partially or completely. The means B operates to draw the lifted "drop" from the means A either to transfer said drop to a storage bin or the like (not shown) or to the machine X to be processed with the cotton being picked, as shown. The elevating means C operates to vertically position the means A so that it functions properly and to disengage said means A from the ground, when and if so desired. And, the stripping means D operates to eliminate the collection of trash on the parts involved in the means A.

The cotton or material engaging means A that operates to collect the material or "drop" cotton and to lift it off the ground is a mechanical means involving, generally, a multiplicity of fingers 25 that engage the "drop" cotton at the ground and then shift upwardly carrying the "drop" cotton therewith. The multiplicity and/or closeness of the fingers 25 is governed by the normal size of the "drop" cotton it being preferred, for example, to space the fingers about an inch to two inches or so apart so as to cover the area of the furrow F between the rows R and R". Since the gathering apparatus Y is adapted to advance or move forwardly along the furrow F the multiplicity of fingers 25 are carried so as to shift rearwardly relative to the apparatus Y as the apparatus moves forwardly with the machine X. In this way the fingers 25 have the effect of standing still relative to the ground. Therefore, we prefer to employ a continuous series of fingers 25 in the form of a multi-fingered wheel 30 so that successive fingers 25 engage the ground as the wheel 30 rolls forwardly, and we prefer to employ a plurality of wheels 30 in side-by-side relationship. With the wheels of fingers there are spaced fingers 25 engageable over the width of the furrow F, as covered by said wheels 30, and as the wheels roll ahead, the fingers 25 are individually brought downward into engagement with the ground and are also individually lifted from the ground. By having ground engagement, the wheels 30 revolve without being powered.

As shown in FIGS. 7 through 10, a plurality of wheels 30 are arranged together in order to form what we will term a roller, there being rollers a, b and c to cover the contour of the furrow (see FIG. 4). The wheels 30 are preferably alike, that is, they are of the same size and number of fingers 25, and each involves a finger mounting or hub 31 and a central bearing 32. The hub 31 is a disc-shaped part carried by the bearing 32, the bearing being of sufficient axial extent to space the adjacent wheels 30. The fingers 25 can be anchored to the mounting or hub 31 in any suitable manner, however, it is advantageous to form the fingers 25 in pairs and of a single length of material joined together at the base ends 26 of the fingers. Each finger has a shank portion 27, the shank portions of the pair being divergent and the bases being joined together forming a U. In order to secure the pairs of fingers to the hub 31 a screw fastener 28, or the like, is passed through the hub to clamp a washer onto the U-shaped part formed by the joinder of the two fingers. It will be apparent how the fingers can be clamped in working position, adjusted, and/or replaced, as desired.

In FIGS. 9 and 10 of the drawings we have shown a securement of the fingers 25, or U-shaped finger units, that involves a U-shaped boss 33 formed at the periphery of the hub 31' and a clamp 34 to secure the base ends 26 of the fingers engaged with said boss. The clamp 34 can be a ring, or a unit for each pair of fingers, or a segmental ring formed with a recess that is also U-shaped and which accommodates the base ends 26 of the fingers to hold them against the hub 31'. As shown, the clamp 34, or clamps, or segments thereof, can be fastened by means of spot welding, or the like.

A feature of the cotton engaging means A is the formation of the finger tips 35, said tips 35 being disposed to be projected substantially straight into or toward the ground and to have a hooking effect and a consequent lifting action. That is, when the individual fingers 25 are lowered by the wheel 30 the tips 35 thereof are substantially normal to the ground upon initial contact, and when the fingers are raised by the wheel 30 the tips are revolved so as to be angularly related to the ground. Therefore, the tips 35 are deflected from the axes of the shanks 27, or forwardly in the direction of rotation, as shown. Thus, the tips 35 penetrate the ground surface and the "drop" cotton thereon, and as the finger tips 35 are raised they become substantially horizontal in order to lift the "drop" cotton from the ground surface.

Since the usual furrow F involves a valley 20 and inclined sides 21 and 22, as above set forth and shown, we prefer to employ separate cylindrically shaped rollers $a$, $b$ and $c$, comprising the wheels 30 of fingers 25, all as above described. It is to be understood that we contemplate contouring of the roller or rollers in order to fit the general contour of the ground that is to be engaged, as by providing fingers of varying lengths at different points along the roller or rollers. However, it is preferred that one or more straight cylindrical rollers be employed, for example, and as shown, a roller $a$ to cover the valley 20, a roller $b$ to cover the side 21, and a roller $c$ to cover the side 22. In practice, the ground is soft enough to be penerated by the fingers 25 by simply applying the weight of the rollers, it being found that a roller made of steel and as shown throughout the drawings is of approximately suitable weight. Because the sides 21 and 22 are substantially inclined the rollers $b$ and $c$ are permitted to roll on inclined axes. It will be seen that substantially uniform penetration of the fingers 25 is maintained with the rollers $a$, $b$ and $c$ rotated, as shown, to follow the portions 20, 21 and 22.

In order to relate the rollers $a$, $b$ and $c$ as above described and shown in FIG. 4, we allow the outside rollers $b$ and $c$ to overlap the center roller $a$. In carrying out the invention we therefore stagger the rollers and prefer to position the rollers $b$ and $c$ side by side and to precede the roller $a$. As best illustrated in FIG. 3 a vertically disposed draw bar 40 depends from the cotton picking machine X and tongues 41, 42 and 43 project forwardly from the three individual rollers $a$, $b$ and $c$ to have coupled engagement with the lower end of the bar. The lower end of the bar 40 carries a transverse bar member 44, the tongue 42 being coupled to the center of the bar, the tongue 41 being coupled to one side of the bar and the tongue 43 being coupled to the other side of the bar.

In FIG. 7 of the drawings we have shown the preferred form of coupling the rollers $a$, $b$ and $c$ to the bar member 44, and which involves the axle 45 that rotatably carries the wheels 30, a fork 46 that carries the ends of the axle 45 and engaged forwardly around the rollers, and a universal swivel mounting 47 that permits the roller to roll to any desired inclined axis of rotation. The mounting 47 is incorporated in each of the tongues 41, 42 and 43 in a manner that requires the tongues to project rearwardly and to prevent side motion thereof. As shown, the mounting 47 involves a transverse and horizontally disposed pivotal axis at the forward end of the tongue established by a pivot pin 48 that couples the tongue to the bar member 44, and involves a longitudinally disposed pivotal axis at the rearward end of the tongue established by a trunnion 49 that rotatably couples the tongue to the fork 46. As shown in FIG. 7, the trunnion 49 projects from the fork 46 and is coupled to a surrounding part at the rear of the tongue. With this structure, the roller is guided upwardly and downwardly and is permitted to roll on said longitudinal axis.

The transporting means B that operates to draw the lifted material or "drop" cotton from the means A above described is an air suction means that extends from the fingers 25 and in the case illustrated to a picking head Z. The means B involves a suction head 50, preferably a suction head 50 at each roller $a$, $b$ and $c$, a suction tube 55, preferably a suction tube 55 in communication with each head 50, a fan 60 and a delivery duct 65. Since the individual rollers $a$, $b$ and $c$ are permitted to roll and to move up and down independently of each other, each roller is related to a suction head 50 and a suction tube 55. The head 50 is positioned at the periphery of the wheels 30 at or above the ground level, preferably a substantial distance above the ground so that earth and clods, or the like, are not drawn into the tube 55. The head 50 has an elongate slot-like aperture 53 that extends coextensively with the width of the roller, and the head narrows in width as it extends away from the roller in order to join with the tube 55 that is preferably round in cross-section. As shown, the head 50 is held in place, adjustably if necessary, by braces 51 (see FIGS. 3 and 8) and 52 and so that the aperture 53 occurs at the periphery of the wheels 30 to draw cotton fibers and seed off of the finger tips 35.

The suction tubes 55 extend from the heads 50, there being three heads and three tubes in the form of the invention under consideration, and they are flexible tubes in order to permit freedom of movement of the rollers $a$, $b$ and $c$. Jointed and articulated metal tubing can be employed, however, we have indicated use of a flexible tube, as for example, a thin-walled fabric impregnated with rubber, or the like, and reinforced with metal ribbing. Since the suction of the several tubes 55 is to be handled by a single fan 60 we have employed a reducer 56 (see FIG. 5) that collects the suctions of the individual tubes and funnels them into one flow tube 57 (see FIG. 3). It will be apparent how the cotton and seed with a certain amount of trash will be conducted from the rollers $a$, $b$ and $c$ through the heads 50, tube 55, and through the flow tube 57.

The fan 60 is preferably a relatively low velocity fan and of the type commonly employed on cotton picking machinery to transport cotton fibers and seed. As shown in FIG. 5 the fan involves a scroll 61 with a central inlet opening in communication with the flow tube 57, and with a peripheral outlet opening 62 in communication with the delivery duct 65. An impeller wheel 63 operates in the scroll 61 driven by a shaft 63' through a drive belt 64 powered from the prime mover 15. A power-take-off shaft 64' is shown driving a pulley over which the belt 64 operates to drive a pulley on the shaft 63'. It will be apparent how the fan 60 is operated at a suitable and efficient speed, as circumstances require.

The delivery duct 65 receives the discharge of the fan 60 through the opening 62 and in accordance with the preferred form of the invention extends to a picking head Z where the gathered "drop" cotton is discharged to be processed by the picking machine X. The construction and cross-section of the duct 65 can vary widely and is preferably such as to include trash separating elbows 66, as shown in FIG. 6. Thus, the duct 65 is preferably such as to include two turns, 90° turns as shown, the elbows 66 forming said turns in order to bleed off excess volume of air and to centrifugally discharge trash particles. Said elbows 66 are of the usual construction involving longitudinally extending rods 67 that are parallel with each other and that extend around outside openings in the turns of the duct 65. In accordance with the invention, the duct has a vertically disposed discharge section 68 that opens downwardly into and communicates with the interior of the picking head Z. The discharge section 68 directs the recovery material onto the cotton picking spindles that are in the process of being operated through their picking cycle. It will be apparent, therefore, that the "drop" cotton is gathered by the wheels 30 and is finally discharged into the picking head in the presence of the spindles operating therein, where it is processed and screened by operation of the picking spindles as they also operate to draw cotton from the bolls of the plants.

In accordance with the invention the draw bar 40 is shiftable vertically by the elevator means 16 of the cotton picking machine X. As shown in FIG. 3, the machine X is provided with said elevator means 16 that involves a control shaft 70 under the control of the operator. The shaft 70 is revolved in the usual manner to the desired rotative position in order to elevate the picking heads Z, as required. Therefore, we have provided a lever arm or drum 71 that is rotated by the shaft 70 and we have provided a lift cable 72 that operates between the drum 71 and bar 40 to elevate the bar along with elevating of the heads Z. As shown, the cable 72 is operable over the drum 71 and extends over suitable sheaves 73 and is anchored to the bar 40 at 74. It will be readily apparent how the bar 40 is elevated together and simultaneously with the picking heads Z. Excessive lowering of the wheels 30 is limited by stop chains 72'.

The trash stripping means D operates to eliminate the collection of trash on the finger tips 35 and acts to strip trash from the finger tips 35 after said tips have passed by the aperture 53 of the means B. In actual operation it has been found that trash particles, such as leaves and empty bolls, are pierced by the fingers 25 and because of the frictional engagement with the fingers they do not readily release from the fingers. That is, the suction of air into the aperture 53 is not sufficient to dislodge all trash from the finger tips 35. Therefore, we have provided the stripping means D that involves an involute arm 75 at each side of a series of fingers 25, or at each side of a wheel 30 of fingers 25. In practice, there is an arm 75 intermediate adjacent wheels 30 and an arm 75 adjacent each end wheel 30, and as shown, the arms 75 are alike. Each arm 75 is anchored so as to extend involutely toward the direction of rotation of the wheels 30 and is of maximum radius at about the top of the wheels. For example, the arm 75 is of minimum radius at about axle height at the rear of the wheels 30 and extends forwardly at a substantially constant radius, the foremost portion of the arm being curved upwardly in order to slide over the trash as the structure moves ahead. As shown, the uppermost portion of the arm 75 extends forwardly and is anchored to the transverse portion of the fork 46 as by fasteners 76. The outer faces of the arms 75 are flat and closely approach the fingers 25 so that trash carried by the fingers is carried radially outward and is dislodged from the finger tips 35 at the tops of the wheels 30, as indicated.

In FIGS. 11 and 12 of the drawings, we have shown a modified form of finger carrying structure wherein the wheels actually establish a cylindrical drum 80. In this form of the invention the wheels 30' are provided with a cylindrically shaped rim 81 of limited axial extent. In this case, the rim 81 of one wheel 30' closely approaches the next adjacent wheel 30', said rims being of the same diameter, and with the result that a drum of independently turning wheels is established. It is to be understood that the plurality of wheels 30' can be locked together rotatably, or a single drum-shaped element can be provided upon which the fingers can be mounted. However, it is preferred to have independently operating wheels 30, the rims limiting the penetration of the finger tips 35 into the cotton fibers and trash.

In the last form of the invention, now under consideration, the fingers 25' are shown as straight elongate fingers, the finger tips 35' being straight continuations of the shanks 26'. It is contemplated, and it has been found to be practical, in some cases, to employ straight fingers 25' relying upon frictional engagement of the material being picked up in order to lift said material from the ground.

When employing the wheels 30' that establish a drum 80 we employ a modified stripping means D'. As shown in FIGS. 11 and 12, the means D' involves an arm 75' that extends between adjacent series of finger tips 35', and an arm 75' at each end of the arm 80. The arms 75' are substantially straight members that are tangentially related to the wheels 30'. As shown, the arms 75' project rearwardly from the fork 46 and enter between the wheels 30' where they engage or closely approach the peripheries of the rims 81. Thus, as the wheels revolve, the arms 75' have an outward wedging action that forces trash off of the fingers 35'.

In the particular form of the invention shown in FIGS. 11 and 12, the arms 75' are made of a sheet of material that is slotted at intervals establishing independent arms 75'. In order to prevent accumulation of material at the bottoms of the slots we provide an enlarged opening 82 positioned at about the periphery of the finger tips 35'. The openings 82 act to release trash that might in some cases wedge between the arms 75' and the fingers 25' to be pressed to the bottom of the slots.

In FIG. 13 of the drawings, we have shown a modified form of ground engaging finger 25" wherein the tips 35" are curved or arcuate in form. This particular finger configuration has no sharp or angular corners or bends and yet has the hooking effect of the finger 25 above described but more readily doffs the cotton and trash that it penetrates.

From the foregoing it will be readily understood how "drop" cotton and a certain amount of trash accumulated therewith will be lifted from the ground level by operation of the fingers 25 carried by the wheels 30. Further, it will be readily understood how the transporting means B operates to draw by air suction the fibers from the tips 35 of the fingers 25. The cotton fibers and seed that are gathered by operation of the means A and B as above described are transported to the picking head Z of the picking machine X where the spindles operating in the head X process the fibers that are gathered, to the end that the fibers are separated from the trash along with the new cotton that is picked directly from the plants of the row R. As is shown, the apparatus Y includes a shield 18' that deflects overhanging foliage. By employing the apparatus of the present invention along with a cotton picking machine there is substantially no waste or "drop" cotton left upon the ground resulting in an increase in the yield of the crop.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described my invention, I claim:

1. An apparatus for gathering material from the ground and including, a material engaging means comprising a wheel of radially disposed and separated fingers and said fingers operable to have rolling contact with the ground and to pierce said material, a material transporting means adjacent the first mentioned means and operable to draw the material therefrom, and a stripping means at the first mentioned means and operable to eliminate collection of material thereon.

2. An apparatus for gathering material from the ground and including, a material engaging means comprising a wheel of radially disposed and separated fingers and said fingers operable to have rolling contact with the ground and to pierce said material at the ground and then revolve carrying said material upwardly, and a material transporting means adjacent the first mentioned means and operable to draw the material therefrom.

3. An apparatus for gathering material from the ground and including, a material engaging means comprising a wheel of laterally spaced radially disposed and separated fingers and said fingers operable to have rolling contact with the ground and to pierce the material at the ground and then revolve carrying said material upwardly, and a material transporting means adjacent the first mentioned means and operable to draw the material therefrom.

4. An apparatus for gathering material from the ground and including, a material engaging means comprising a wheel of a multiplicity of radially disposed and separated fingers arranged in a circular series and said fingers operable to have rolling contact with the ground and to consecutively pierce the material at the ground and then revolve carrying said material upwardly, and a material transporting means adjacent the first mentioned means and operable to draw the material therefrom.

5. An apparatus for gathering material from the ground and including, a material engaging means comprising a wheel of a multiplicity of radially disposed and separated fingers spaced side by side in a plurality of circular series and said fingers operable to have rolling contact with the ground and to consecutively pierce the material at the ground and then revolve carrying said material upwardly, and a material transporting means adjacent the first mentioned means and operable to draw the material therefrom.

6. An apparatus for gathering material from the ground and including, a material engaging means comprising individually rotatable wheels of a multiplicity of radially disposed and separated fingers arranged in circular series and said fingers operable to be in contact with the ground and to consecutively pierce the material at the ground and then revolve carrying said material upwardly, and a material transporting means adjacent the first mentioned means and operable to draw the material therefrom.

7. An apparatus for gathering material from the ground and including, a material engaging means comprising laterally spaced radially disposed and separated fingers and said fingers operable to have rolling contact with the ground and to pierce the material at the ground and then revolve carrying said material upwardly, a material transporting means adjacent the first mentioned means and operable to draw the material therefrom, and a stripping means comprising a bar fixed between adjacent laterally spaced fingers and operable to dislodge material therefrom as they revolve.

8. An apparatus for gathering material from the ground and including, a material engaging means comprising laterally spaced radially disposed and separated fingers and said fingers operable to have rolling contact with the ground and to pierce the material at the ground and then revolve carrying said material upwardly, a material transporting means adjacent the first mentioned means and operable to draw the material therefrom, and a stripping means comprising an involute bar fixed between adjacent laterally spaced fingers and operable to dislodge material therefrom as they revolve.

9. An apparatus for gathering material from the ground and including, a material engaging means comprising a wheel of radially disposed and separated fingers and said fingers operable to have rolling contact with the ground and to pierce said material, a material transporting means adjacent the first mentioned means and operable to draw the material therefrom and comprising an air suction means with an inlet aperture at the periphery of the wheel.

10. An apparatus for gathering material from the ground and including, a material engaging means comprising a wheel of radially disposed and separated fingers and said fingers operable to have rolling contact with the ground and to pierce said material, a material transporting means adjacent the first mentioned means and operable to draw the material therefrom and comprising an air suction means with an inlet aperture at the periphery of the wheel, and a stripping means operable to eliminate collection of material at the first mentioned means.

11. An apparatus for gathering material from furrows formed in the ground and including, angularly related cylindrically shaped wheels and each comprising laterally adjacent series of radially disposed and separated fingers that roll onto and engage the material at the ground carrying said material upwardly, and material transporting means adjacent each of said wheels and operable to draw the material from the fingers.

12. An apparatus for gathering material from furrows formed in the ground and including, angularly related cylindrically shaped wheels and each comprising laterally adjacent series of radially disposed and separated fingers that roll onto and engage the material at the ground carrying said material upwardly, there being a cylindrical wheel to engage each opposite side wall of the furrow, and material transporting means adjacent each of said wheels and operable to draw the material from the fingers.

13. An apparatus for gathering material from furrows formed in the ground and including, angularly related cylindrically shaped wheels and each comprising laterally adjacent series of radially disposed and separated fingers that roll onto and engage the material at the ground carrying said material upwardly, there being a cylindrical wheel to engage the bottom and each opposite side wall of the furrow, and material transporting means adjacent each of said wheels and operable to draw the material from the fingers.

References Cited in the file of this patent

UNITED STATES PATENTS

| | | |
|---|---|---|
| 1,587,668 | Mitchell | June 8, 1926 |
| 1,638,867 | Melton | Aug. 16, 1927 |
| 1,650,796 | Kellogg | Nov. 29, 1927 |
| 1,836,128 | Palmer | Dec. 15, 1931 |
| 2,111,016 | Worthington | Mar. 15, 1938 |
| 2,538,454 | Hart | Jan. 16, 1951 |
| 2,674,076 | Bryant | Apr. 6, 1954 |
| 2,674,080 | Wilson | Apr. 6, 1954 |
| 2,699,637 | Nisbet | Jan. 18, 1955 |
| 2,811,004 | Borrow | Oct. 29, 1957 |
| 2,909,882 | Lewis | Oct. 27, 1959 |